United States Patent [19]
Sasaki

[11] Patent Number: 5,984,222
[45] Date of Patent: Nov. 16, 1999

[54] RECORDING MEDIUM ACCOMMODATION CASSETTE

[75] Inventor: Kazuo Sasaki, Miyagi, Japan

[73] Assignee: Sony Corporation, Japan

[21] Appl. No.: 08/919,819

[22] Filed: Aug. 29, 1997

[30] Foreign Application Priority Data

Aug. 30, 1996 [JP] Japan .................................. 8-230858

[51] Int. Cl.$^6$ ........................... G11B 23/04; G11B 23/02
[52] U.S. Cl. ...................... 242/347; 360/132; 206/387.1
[58] Field of Search .................................. 242/347, 348, 242/914; 360/132; 206/387.1

Primary Examiner—John Q. Nguyen
Attorney, Agent, or Firm—Ronald P. Kananen; Rader, Fishman & Grauer

[57] ABSTRACT

A recording medium accommodation cassette, wherein a part of a cassette shell is formed of a metallic plate, which is formed with a punched hole formed by press, and the metallic plate is disposed such that a shear face of the punched hole therein is located inwardly of the cassette thereby being in contact with a structural part within the cassette thereby inhibiting a burr produced in a punched hole in the metallic plate from being in contact with a structural component within the cassette (e.g., a reel) to produce shaving powders or particles.

13 Claims, 6 Drawing Sheets

F I G. 5A
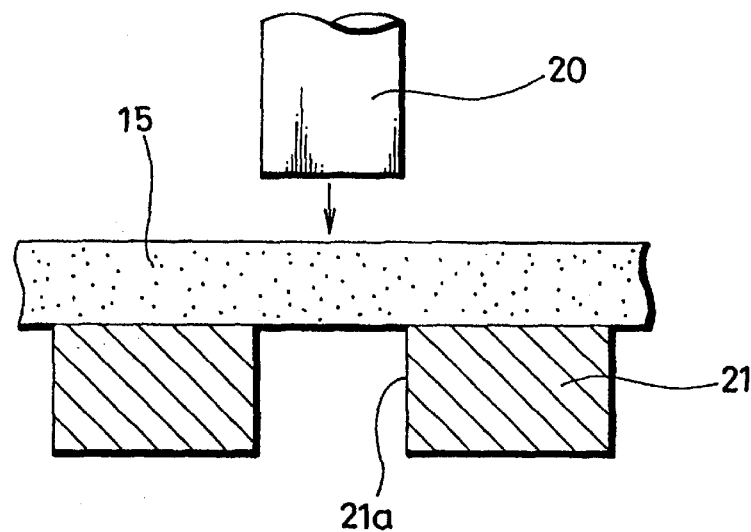
F I G. 5B
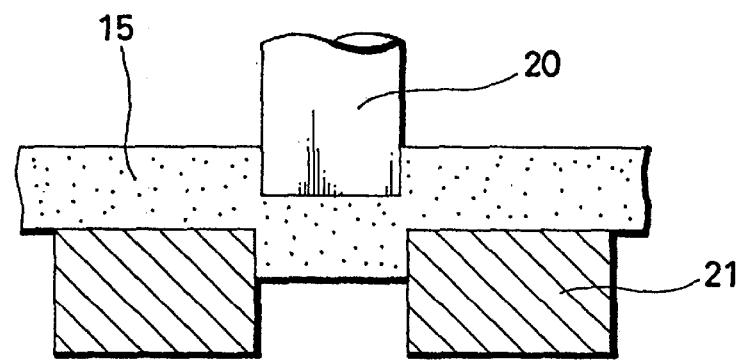
F I G. 5C
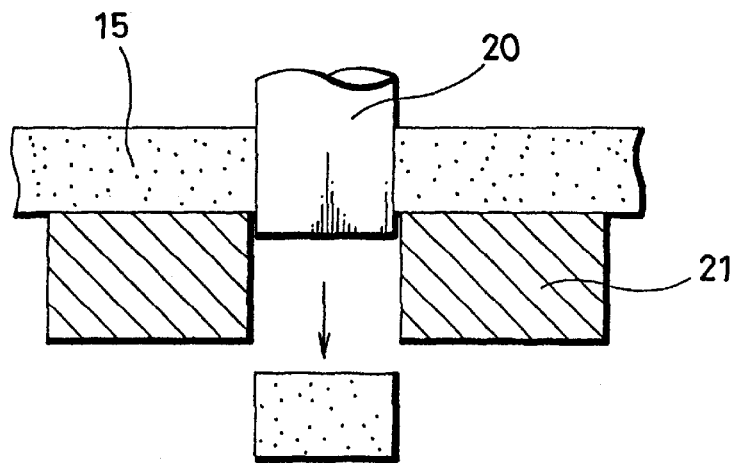

RECORDING MEDIUM ACCOMMODATION CASSETTE

BACKGROUND OF THE INVENTION

The present invention relates to a recording medium accommodation cassette and more particularly to a cassette in which a part of a cassette shell thereof is formed of a metallic plate.

Referring to FIGS. 1 to 3, the structure of a so-called 8-mm video cassette will be described as an example of a recording medium accommodation cassette.

Referring to the Figures, reference numeral 1 denotes an entire 8-mm video cassette and reference numeral 2 denotes a cassette shell (case) thereof. This cassette shell 2 is formed by combining an upper shell 3 and a lower shell 4 and fixing them to each other with screws and so on.

The cassette shell 2 accommodates therein a pair of reels, that is, a take-up reel 6 and a supply reel 7 such that they are rotatable.

The reels 6, 7 comprise hubs 6a, 7a, upper flanges 6b, 7b, and lower flanges 6c, 7c respectively and a magnetic tape 8 is wound around the hubs 6a, 7a of the reels 6, 7 respectively such that both ends of the tape 8 are fixed to the hubs 6a, 7a, respectively.

Tape guide portions 9a, 9b are provided on the left and right sides of the front portion of the lower shell 4. Then, a tape traveling path is formed such that the magnetic tape 8 derived from the supply reel 7 passes through the tape guide portion 9b, runs over the front part of the cassette shell, then passes through the tape guide portion 9a and finally is wound up by the take-up reel 6.

Reference numeral 10 denotes a lid for protecting the magnetic tape 8 which travels over the front part of the cassette shell. When the cassette is not in use, the lid 10 covers an exposed portion of the magnetic tape 8 over the front part of the cassette shell, while when the cassette is in use (when the cassette is inserted into a cassette deck), the lid 10 is rotated upward so that it opens so as to expose the magnetic tape 8.

Further, a pair of reel springs 11a, 11b (left, right springs) each being made of a leaf spring are attached to an internal surface of the upper shell 3 so that the reels 6, 7 are always pressed down to the lower shell 4 by the reel springs 11a, 11b thereby preventing the reels 6, 7 from being loose.

Further, within the cassette shell 2, a reel lock member 12 is assembled to a backward portion between both the reels 6 and 7. The reel lock member 12 is always urged toward the reels 6, 7 by the force of a reel lock spring 13. When the cassette is not in use, the reel lock member 12 engages engaging teeth 6d, 7d formed on outer peripheral edges of the lower flanges 6c, 7c of the reels 6, 7 so that the reels 6, 7 are locked from rotation thereby preventing the magnetic tape 8 from being loose.

In the tape cassette 1 having the above described structure, the cassette shell 2 is generally formed of resin (plastics) such as an ABS or the like. However, recently, formation of a part of the cassette shell with a metallic plate has been considered so as to further improve the stiffness of the cassette shell and also produce a luxurious feeling in its appearance.

As evident in FIGS. 2 and 3, a metallic plate 15 made of metal such as aluminum or the like is inserted into the central portion of a bottom portion 4a of the lower shell 4 supporting the reels 6, 7.

The metallic plate 15 is inserted upon molding of the lower shell 4. That is, upon molding of the lower shell 4, the metallic plate 15 is inserted within a molding die from the beginning and then with that condition, resin is injected into the molding die, so that the lower shell 4 having the metallic plate 15 integrally as shown in FIG. 3 is molded.

The metallic plate 15 to be inserted into lower shell 4 is provided with a plurality of punched holes 16 as shown in FIG. 3.

Here, 16a and 16b are reel driving shaft insertion holes, respectively, and 16c is a reel lock releasing member insertion hole.

The reel driving shaft insertion holes 16a, 16b are punched holes provided corresponding to the reels 6, 7, respectively. The reel driving shafts provided on the side of a cassette desk are inserted into these holes and engaged with the reels 6, 7, respectively.

The reel lock releasing member insertion hole 16c is a punched hole corresponding to the reel lock member 12. A reel lock releasing member provided on the cassette deck is inserted into this hole and then the reel lock member 12 is operated thereby unlocking the reels 6, 7.

These punched holes 16 are formed by punching the metallic plate 15 by means of press. This punching operation is outlined in FIGS. 5A–5C.

In FIGS. 5A–5C, reference numeral 20 denotes a punch and numeral 21 denotes a die having a concave portion 21a corresponding to the punch 20. Meantime, there is a slight clearance between the punch 20 and the die 21 such that an inner diameter of the concave portion 21a of the die 21 is slightly larger than an outer diameter of the punch 20.

With the metallic plate 15 set over the die 21 with the concave portion 21a as shown in FIG. 5A, when the punch 20 is descended from a higher position than the metallic plate 15 at a large pressing force, then as shown in FIG. 5B, until the punch reaches a middle portion in the thickness of the metallic plate 15, the metallic plate 15 is shorn between the punch 20 and the concave die 21, and finally the metallic plate 15 is punched out as shown in FIG. 5C in such a state that the metallic plate 15 is ruptured between the punch 20 and the concave die 21.

FIG. 4 shows an enlarged view of a condition of the punched hole 16 formed in the metallic plate 15 by punching work.

As evident from FIG. 4, the punched face (internal circumferential face) of the punched hole 16 is formed of a shear face 17 and a fracture face 18. Up to the middle in the punching direction, there is provided the shear face 17 which shows a straight surface produced by shearing, and which is followed by the fracture face 18 which shows sawtooth shape produced by fracture.

An end edge portion 17a of the shear face 17 of the punched hole 16 is formed in a mild round corner shape deformed by the pressing force upon punching, while an end edge portion of the fracture face 18 has a so-called punch-out burr 19 produced upon fracture, which protrudes sharply. A protrusion amount $h_1$ of the punched-out burr 19 differs depending on a thickness of the metallic plate 15. If the thickness of the metallic plate 15 is 1.2–1.5 mm, $h_1$ is about 20–30 μm.

Thus, if as shown in FIGS. 6, 7, the punched-out burr 19 is in contact with a structural component in the cassette or the lower flanges 6c, 7c of the reels 6, 7, in this example and hence friction is generated between the burr 19 and the lower flanges 6c, 7c of the reels 6, 7 so that the resin of the lower flanges 6c, 7c of the reels 6, 7 is shaved thereby producing shaving powders. Further, if the shaving powders adhere to the magnetic tape, it may cause a dropout in recording and reproduction signals thereby deteriorating largely the reliability.

Although there is a method of removing the burr 19 on the metallic plate 15 so as to solve the above problem, it takes a long time and labor to remove the burr completely, so that production cost of the metallic plate 15 is increased. Thus, this is not a practical solution.

Further, although narrowing the clearance between the punch 20 of the press and the concave die 21 is effective as a method of suppressing an occurrence of the burr, in this case, the service life of the die remarkably shortens, so that this method is not suitable for mass production thereof. Still further this method is not capable of removing the burr completely.

SUMMARY OF THE INVENTION

The present invention has been proposed to solve the above problems. Accordingly, an object of the present invention is to provide a cassette having such a structure capable of easily restricting an occurrence of shaving powders.

According to the present invention, there is provided a recording medium accommodation cassette wherein a part of a cassette shell is formed of a metallic plate and the metallic plate is formed with a punched hole by press, the metallic plate being disposed such that a shear face of the punched hole therein is located inwardly of the cassette thereby being in contact with a structural part within the cassette.

According to the present invention, burr produced on the fracture face of the punched hole in the metallic plate is never in contact with any structural part within the cassette. Therefore, it is possible to prevent generation of shaving powders or particles due to contact between the burr and the structural part easily and securely.

BRIEF DESCRIPTION OF THE DRAWINGS

FIGS. 5A–5C are explanatory views for punching work for the metallic plate by means of press;

DETAILED DESCRIPTION OF THE PREFERRED EMBODIMENT

Hereinafter, an embodiment of the present invention will be described with reference to the accompanying drawings.

Figure 1:
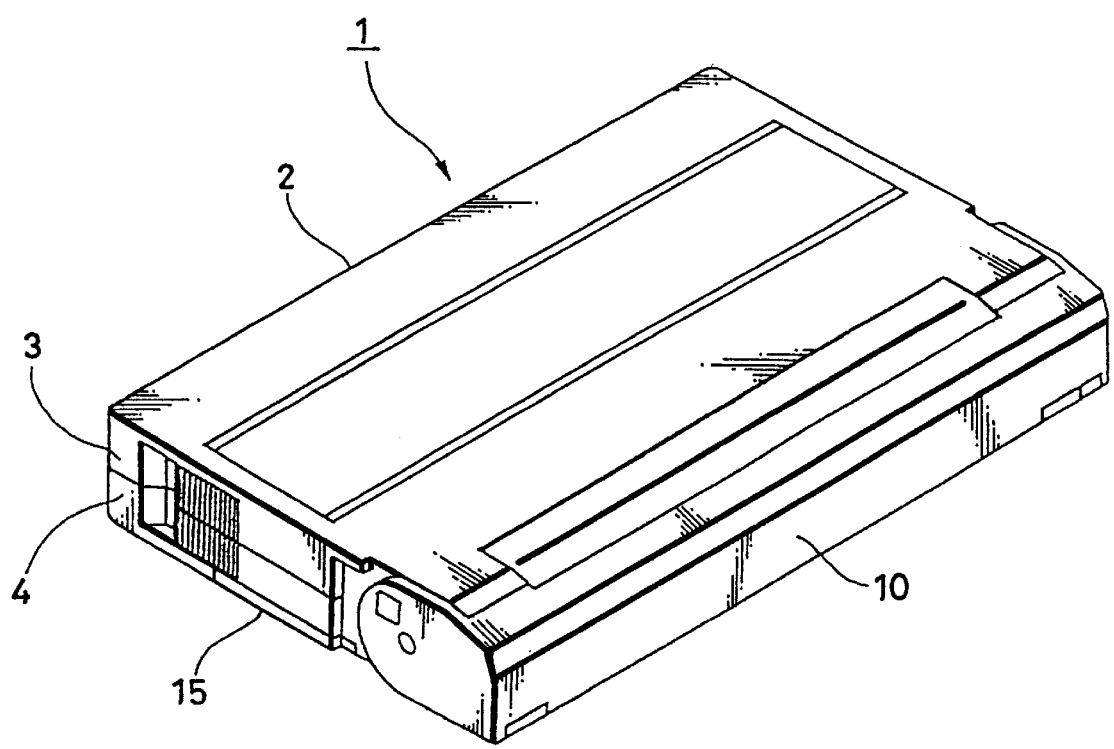
FIG. 1 is a perspective view of a 8-mm video cassette into which a metallic plate is inserted.
Figure 2:
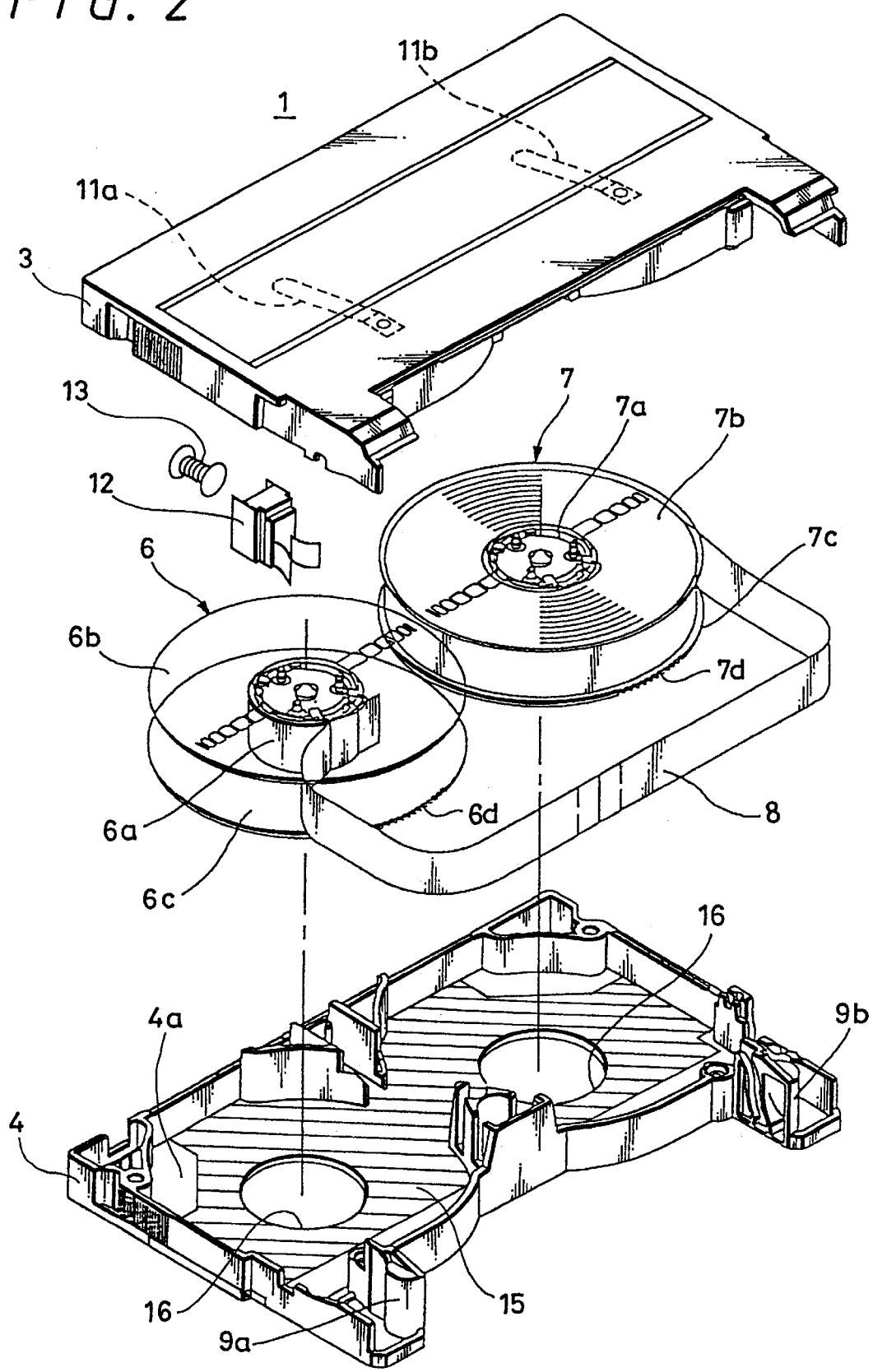
FIG. 2 is an exploded perspective view of the 8-mm video cassette into which the metallic plate is inserted.
Figure 3:
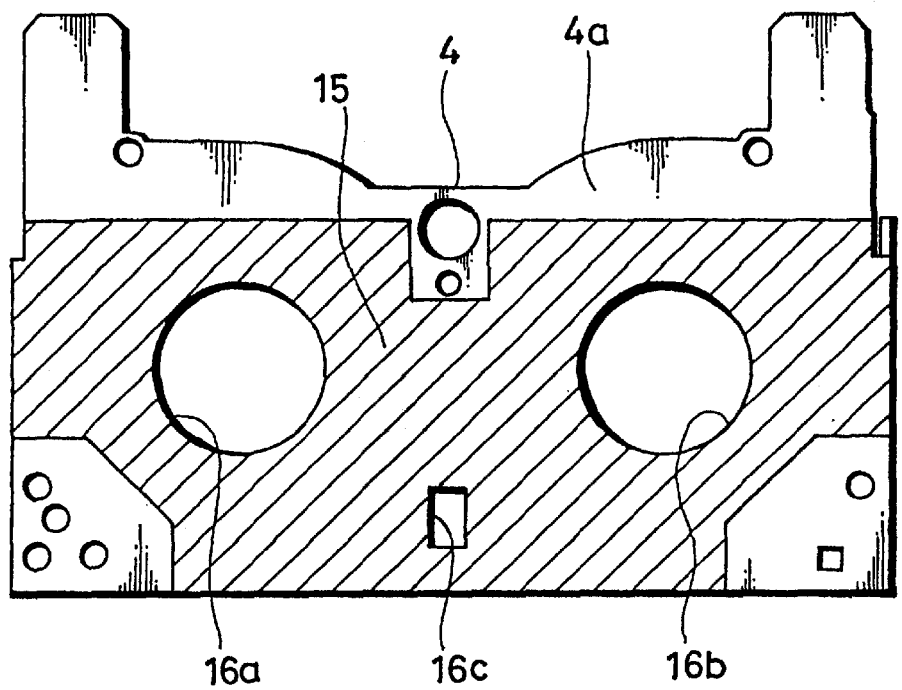
FIG. 3 is a diagram showing a bottom portion of a lower shell of the 8-mm video cassette.

In this embodiment, a case in which the present invention is applied to the 8-mm video cassette shown in FIGS. 1–3 as an example of the recording medium accommodation cassette is exemplified and described.

In FIGS. 1 to 2, reference numeral 1 denotes an entire 8-mm video cassette as a whole and numeral 2 denotes a cassette shell (case) thereof. This cassette shell 2 is formed by combining an upper shell 3 and a lower shell 4 and fixing them to each other with screws or the like.

The cassette shell 2 houses therein a pair of reels, that is, a take-up reel 6 and a supply reel 7 to be rotatable.

The reels 6, 7 comprise hubs 6a, 7a, upper flanges 6b, 7b, and lower flanges 6c, 7c respectively. A magnetic tape 8 as a recording medium is wound around the hubs 6a, 7a of the reels 6, 7 respectively and both ends thereof are fixed to the hubs 6a, 7b, respectively.

Tape guide portions 9a, 9b are provided on the left and right sides at the front portion of the lower shell 4. Then, a tape traveling path is formed such that the magnetic tape 8 delivered from the supply reel 7 passes through the tape guide portion 9b, runs over the front part of the cassette shell, then passes through the tape guide portion 9a and finally is wound up by the take-up reel 6.

There is provided a lid 10 for protecting the magnetic tape 8 which travels over the front part of the cassette shell 2. When the cassette is not in use, the lid 10 covers an exposed portion of the magnetic tape 8 at the front part of the cassette shell 2 and when the cassette is in use (when the cassette is inserted into a cassette deck), this lid 10 is rotated upward so that it is opened so as to expose the magnetic tape 8.

Further, a pair of reel springs 11a, 11b (left, right springs) each being made of a leaf spring are provided on an internal surface of the upper shell 3 so that the reels 6, 7 are always pressed down to the lower shell 4 by the reel springs 11a, 11b thereby preventing the reels 6, 7 from being loose.

Further, within the cassette shell 2, a reel lock member 12 is assembled at a backward portion between both the reels 6 and 7. The reel lock member 12 is always urged toward the reels 6, 7 by the force of a reel lock spring 13. When the cassette is not in use, the reel lock member 12 engages engaging teeth 6d, 7d formed on outer peripheral edges of the lower flanges 6c, 7c of the reels 6, 7. Therefore, the reels 6, 7 are locked from rotation thereby preventing the magnetic tape 8 from being loose.

In the tape cassette 1 having the above described structure, the cassette shell 2 is generally formed of resin (plastics) such as an ABS and so on. However, recently, formation of a part of the cassette shell with a metallic plate has been considered so as to further improve the stiffness of the cassette shell and also produce a luxurious feeling in its appearance.

As will be evident in FIGS. 2 and 3, a metallic plate 15 made of metal such as aluminum or the like is inserted into the central portion of a bottom portion 4a of the lower shell 4 supporting the reels 6, 7.

The metallic plate 15 is inserted upon molding of the lower shell 4. Specifically, upon molding of the lower shell 4, the metallic plate 15 is inserted within a molding die from the beginning and then with that condition, resin is injected into the molding die. Thus, the lower shell 4 having the metallic plate 15 integrally therewith as shown in FIG. 3 is molded.

The metallic plate 15 to be inserted in the lower shell 4 is formed with a plurality of punched holes 16 as shown in FIG. 3.

Here, 16a and 16b are reel driving shaft insertion holes, respectively, and 16c is a reel lock releasing member insertion hole.

The reel driving shaft insertion holes 16a, 16b are punched holes provided corresponding to the reels 6, 7. Reel driving shafts provided on a cassette desk side are inserted into these holes and then engaged with the reels 6, 7, respectively.

The reel lock releasing member insertion hole 16c is a punched hole corresponding to the reel lock member 12. A reel lock releasing member provided on the cassette deck side is inserted into the hole 16c so as to operate the reel lock member 12 thereby unlocking the reels 6, 7.

These punched holes 16 are formed by punching the metallic plate 15 by means of press. This punching work is outlined in FIGS. 5A–5C.

Referring to FIGS. 5A to 5C, reference numeral 20 denotes a convex die or punch and numeral 21 denotes a concave die having a concave portion 21a corresponding to this punch 20. Meantime, there is a slight clearance between the punch 20 and the concave die 21 such that an inner diameter of the concave portion 21a of the concave die 21 is slightly larger than an outer diameter of the punch 20.

With the metallic plate 15 set over the concave die 21 as shown in FIG. 5A, when the punch 20 is descended from a higher position than the metallic plate 15 at a large pressing force, then as shown in FIG. 5B, until the punch 20 reaches a middle portion in the thickness of the metallic plate 15, the metallic plate 15 is shorn between the punch 20 and the concave die 21, and finally the metallic plate 15 is punched out as shown in FIG. 5C in such a state that the metallic plate 15 is ruptured between the punch 20 and the concave die 21.

Figure 4:
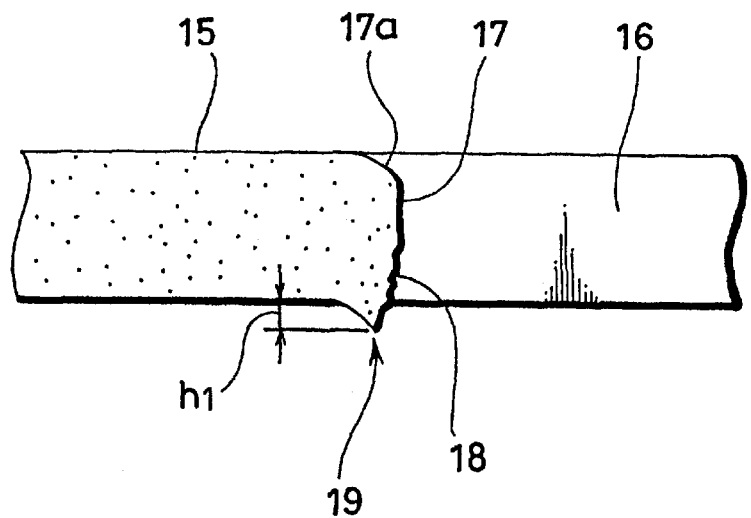
FIG. 4 is an enlarged view of a punched hole in the metallic plate.
Figure 6:
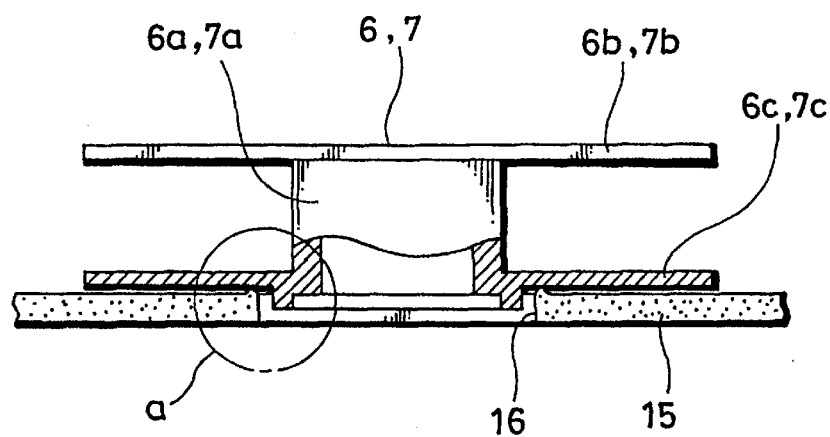
FIG. 6 is a side view showing partly in section of a major part (contact portion between a reel and a metallic plate) of a conventional cassette.
Figure 7:
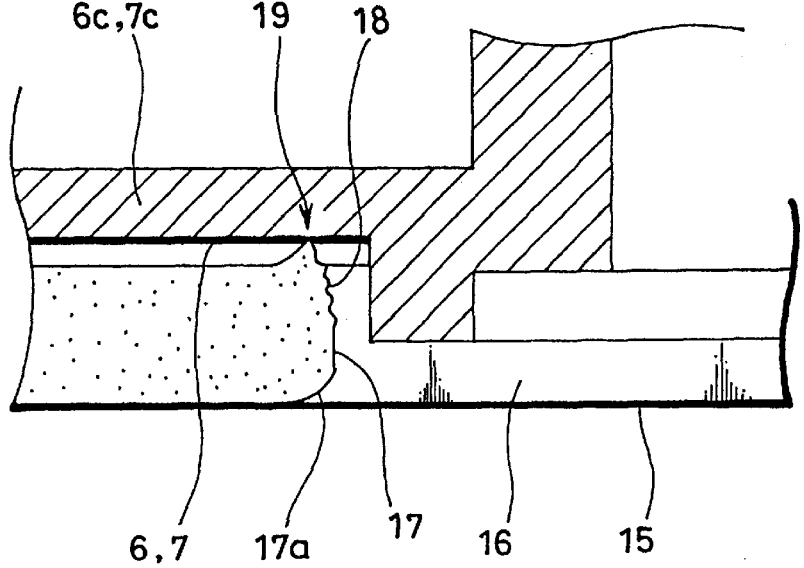
FIG. 7 is an enlarged view of a portion "a" in FIG. 6.

FIG. 4 shows an enlarged view of a condition of the punched hole 16 formed in the metallic plate 15 by punching work.

As will be evident from FIG. 4, the punched hole face (internal peripheral face) of the punched hole 16 comprises a shear face 17 and a fracture face 18. up to the middle in the punching direction, there is provided the shear face 17 which shows a straight surface due to shearing, and which is followed by the fracture face 18 which shows a sawtooth shape due to fracture.

An end edge portion 17a of the shear face 17 of the punched hole 16 is formed in a gentle round corner shape deformed by the pressing force upon punching, while an end edge portion of the fracture face 18 has a so-called punched-out burr 19 produced upon fracture, which protrudes sharply. A protrusion amount $h_1$ of the burr 19 differs depending on a thickness of the metallic plate 15. If the thickness of the metallic plate 15 is 1.2–1.5 mm, h, is about 20–30 $\mu$m.

Figure 8:
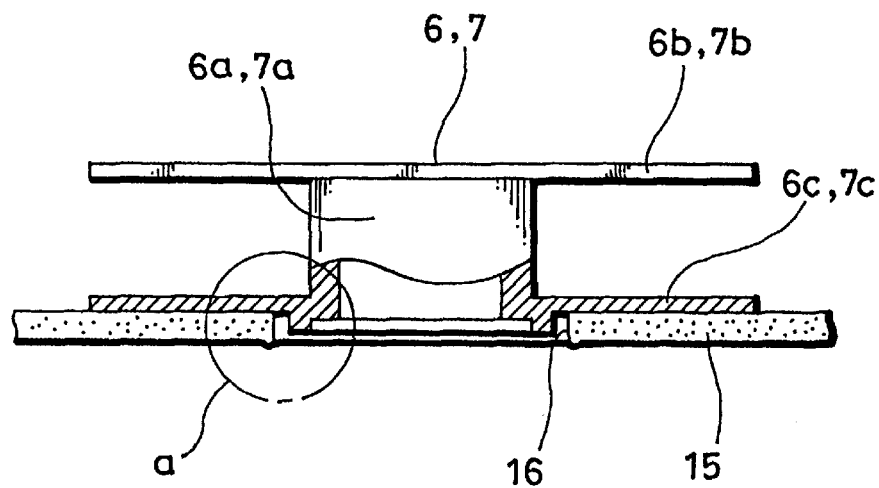
FIG. 8 is a side view showing partly in section a major part (contact portion between the reel and the metallic plate) of a cassette according to the most preferable embodiment of the present invention.
Figure 9:
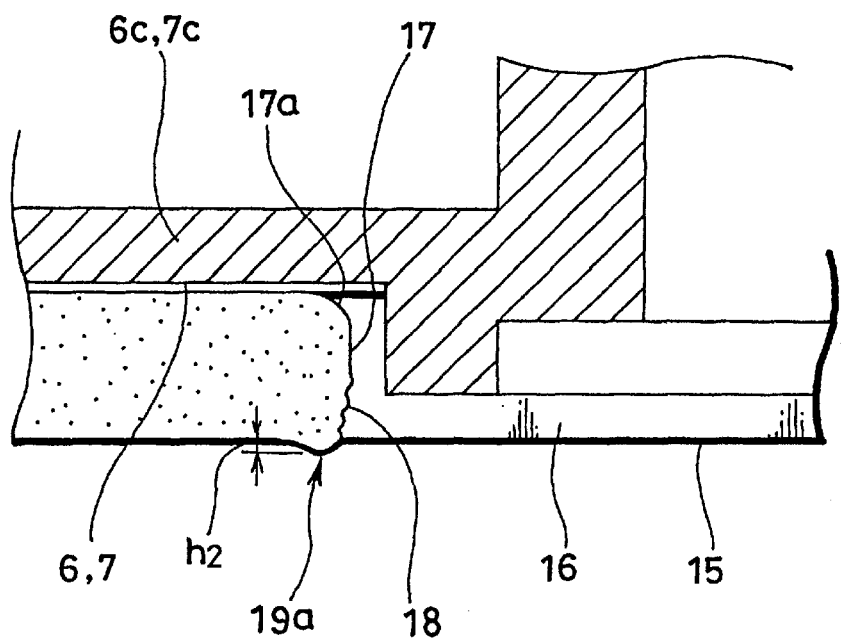
FIG. 9 is an enlarge view of a portion "a" in FIG. 8.

Because the burr 19 affects badly the structural components within the cassette as described above, in a cassette of this embodiment as shown in FIGS. 8 and 9, the metallic plate 15 is disposed such that the side of the shear face 17 of the punched hole 16 is located on the inside of the cassette such that it is in contact with the structural components such as the reels 6, 7 or the lower flanges 6c, 7c thereof and the side of the fracture face 18 thereof is located on the outside of the cassette which is an ornamental surface or appearance. That is, upon molding of the lower shell 4, the metallic plate 15 is inserted into a molding die with the shear face 17 of the punched hole 16 set inwardly so as to mold the lower shell 4.

With such a construction, the punched-out burr 19 produced on the fracture face 18 of the punched hole 16 in the metallic plate 15 is never in contact with the reels 6, 7 or lower flanges 6c, 7c thereof, so that no shaving particles or powders are produced from the reels 6, 7.

On the appearance side or outside of the metallic plate 15, the end edge portion on the side of the fracture face 18 of the punched hole 16 undergoes burr crushing treatment. That is, by carrying out the burr crushing treatment for the burr 19 protruding to the end edge portion of the fracture face 18 of the punched hole 16 in FIG. 4, that portion becomes a burr crushed portion 19a having a roundness as shown in FIG. 9.

This burr crushing work is carried out by press work. In this case, this burr crushing work can be performed in the same press die during the punching process for the metallic plate 15 shown in FIG. 5. By this burr crushing work, the burr is crushed so that a protrusion amount $h_2$ of a burr crushed portion 19a is about 1 $\mu$m.

Because, on the appearance side of the metallic plate 15, the end edge portion of the fracture face 18 of the punched hole 16 is subjected to the burr crushing work, so that a surface without any punched burr is secured. Thus there is no fear that a hand may be injured by the burr when the cassette is held by the hand, so that the safety of the cassette is sufficiently ensured.

Further, because the protrusion amount $h_2$ of the burr crushing portion 19a after the burr crushing work is about 1 $\mu$m, there is little feeling of incongruity in terms of the appearance and sense of touch. Upon use of the cassette also side, it never affects motion of the mechanism of the cassette deck, for example, motion of the reel driving shaft.

Further, because the burr crushing work is performed by press, this work can be executed within the same press die as the punching process, for the metallic plate. Therefore, it can be carried out at cheap cost without any special work.

Although in the above embodiment, a case of the 8-mm video cassette has been taken as an example of the recording medium accommodation cassette, the present invention can not only be applied to tape cassettes such as the 8-mm video cassette but also in a wide range of cassettes such as a disk cassette and the like.

Because the recording medium accommodation cassette according to the present invention is so constructed that a part of a cassette shell is formed of a metallic plate, which has a punched holes formed by press, the metallic plate being disposed such that a shear face of the punched hole therein is located inwardly of the cassette thereby being in contact with a structural part within the cassette, a burr produced on the fracture face of the punched hole in the metallic plate is never in contact with any structural part. Therefore, it is possible to prevent generation of shaving particles or powder from the structural parts easily and securely thereby making it possible to provide a highly reliable cassette.

Further, according to the present invention, the fracture face side of the metallic plate is subjected to burr crushing work so as to ensure a sufficient safety. Because this burr crushing work is performed by press, it can be performed at cheap cost without any special work.

Having described a preferred embodiment of the invention with reference to the accompanying drawings, it is to be understood that the invention is not limited to the precise embodiment and that various changes and modifications could be effected therein by one skilled in the art without departing from the spirit or scope of the invention as defined in the appended claims.

What is claimed is:

1. A recording medium accommodation cassette having a cassette shell, wherein a part of said cassette shell is formed of a metallic plate, said plate provided with a punched hole therethrough formed by pressing, said punched hole defining a shear face, and said metallic plate is disposed in said cassette shell such that said shear face of said punched hole therein is located inwardly of said cassette shell thereby being in contact with a structural part within said cassette.

2. A recording medium accommodation cassette according to claim 1, wherein said punched hole defines a fracture face in said hole opposite said shear face, wherein said fracture face of said punched hole in said metallic plate is located outwardly of said cassette shell thereby being free from contact with said structural part within said cassette.

3. A recording medium accommodation cassette according to claim 2, wherein said fracture face is subjected to a burr crushing work, wherein said burr crushing work is performed by a press.

4. A recording medium accommodation cassette, comprising:
   at least one cassette shell having at least a portion thereof comprising a metallic plate having a first surface and an opposite second surface and formed with at least one punched opening through said metallic plate and extending between said first surface and said second surface, said opening of said metallic plate defining a shear face extending for a portion of said opening extending from said first surface toward said second surface, said first surface of said plate facing an interior of said cassette shell where a structural part of said cassette is located, said second surface of said cassette being an appearance surface and located outwardly of said cassette shell.

5. A recording medium accommodation cassette according to claim 4 further including a structural part of said cassette located at an interior of said cassette shell wherein said first surface of said metallic plate is in contact with said structural part of said cassette.

6. A recording medium accommodation cassette according to claim 5, wherein said structural part comprises a lower flange of a tape reel within said cassette.

7. The recording medium accommodation cassette as set forth in claim 5 wherein said structural part is a flange of a tape reel, said flange having a surface which is coplanar with said first surface of said metallic plate at least at said portion of said first surface at an edge of said shear face.

8. The recording medium accommodation cassette as set forth in claim 4, wherein an edge portion of said shear face is formed in a gentle rounded corner shape at said first surface adjoining said opening and is deformed by a pressing force of a punch during formation.

9. The recording medium accommodation cassette as set forth in claim 4, wherein said opening in said metallic plate further defines a fracture face following said shear face in said opening, said fracture face extending toward said second surface of said cassette shell.

10. The recording medium accommodation cassette as set forth in claim 9 wherein an end edge portion of the fracture face has a punched-out burr produced upon fracture, said burr facing outwardly from said second surface of said metallic plate and thus outwardly of said cassette, wherein said burr is not in contact with a structural part at the interior of said cassette shell so that shaving particles or powders are not produced from said structural part.

11. The recording medium accommodation cassette as set forth in claim 10 wherein said burr protrudes from said second surface of said cassette shell in a first amount.

12. The recording medium accommodation cassette as set forth in claim 10 wherein said burr protrudes from said second surface of said cassette in a second amount.

13. The recording medium accommodation cassette as set forth in claim 10, wherein said burr has a burr crushed portion formed by burr crushing said burr during a punching process.

* * * * *